United States Patent
Simchock

Patent Number: 6,098,918
Date of Patent: *Aug. 8, 2000

[54] ASSEMBLY FOR CABLE WINDING AND DESPOOLING

[75] Inventor: Frederick Simchock, Ewing, N.J.

[73] Assignee: Lucent Technologies, Inc., Murray Hills, N.J.

[*] Notice: This patent is subject to a terminal disclaimer.

[21] Appl. No.: 09/235,682

[22] Filed: Jan. 22, 1999

Related U.S. Application Data

[62] Division of application No. 08/856,225, May 14, 1997, Pat. No. 5,895,005.

[51] Int. Cl.[7] ............................ B65H 75/24; B65H 54/22; B21C 47/24
[52] U.S. Cl. .................. 242/573.9; 242/363; 242/573.1; 242/573.8; 242/473.5; 242/613
[58] Field of Search ............................ 242/571, 571.4, 242/573.1, 573.8, 573.9, 613, 470, 363, 473.5

[56] References Cited

U.S. PATENT DOCUMENTS

| | | | |
|---|---|---|---|
| 3,107,874 | 10/1963 | Wilke | 242/613 |
| 3,617,010 | 11/1971 | Coy | 242/613 |
| 3,779,476 | 12/1973 | Hofbauer | 242/571.4 |
| 5,181,270 | 1/1993 | Hsu et al. | 242/613 |
| 5,895,005 | 4/1999 | Simchock | 242/470 |

*Primary Examiner*—John Q. Nguyen
*Attorney, Agent, or Firm*—Michael Y. Epstein; Henry I. Schanzer

[57] ABSTRACT

An assembly for transferring a wound coil disposed around a first mandrel onto a second mandrel. The first mandrel is radially expandable between first and second outer diameters and the coil is wound onto the first mandrel when in its larger, first outer diameter which is larger than the diameter of the second mandrel. The two mandrels are disposed in side-by-side coaxial relationship and the diameter of the first mandrel is reduced for reducing the radial stress of the wound coil against the first mandrel for facilitating movement of the coil off the first mandrel and onto the second mandrel.

7 Claims, 4 Drawing Sheets

6,098,918

ASSEMBLY FOR CABLE WINDING AND DESPOOLING

This is a divisional of appliction Ser. No. 08/856,255 filed on May 5, 1997, U.S. Pat. No. 5,895,005.

BACKGROUND OF THE INVENTION

This invention relates, in general, to the manufacture of cables and, particularly, to an assembly for the transfer of a wound cable, i.e., a coil, on one spool directly onto another spool.

In the handling of many types of "cables", e.g., sewing thread, metal wires, optical fibers and the like, it is convenient to wind the cable onto a spool. Typically, the cable is thereafter wound off the spool in use of the cable, but there are occasions where it is desirable to transfer an entire coil wound on a first spool to a second spool directly and without unwinding the coil.

The present invention has particular, but not exclusive, use with optical fibers used in telecommunications apparatus. In one such apparatus, a custom designed optical fiber coil, i.e., designed in connection with a particular apparatus, is first wound onto a first spool ("mandrel", hereinafter) in known fashion and then the wound coil is then directly transferred onto a mandrel of an apparatus in process of manufacture. In the coil transfer process the "first" mandrel carrying the custom designed optical fiber coil is disposed directly over and coaxial with the second mandrel onto which the coil is transferred. Then, gently and aided by probes and the like, the coil is manually nudged off the first mandrel and onto the second.

In anticipation of such transfer operation, the coil is wound onto the first mandrel with a minimum tension. Still, and dependent upon the number of turns of the coil, the coil is compressively clamped around the mandrel. Accordingly, while the transfer process works and is regularly used, it requires great care and time. Also, all too often, a slip occurs and the delicate optical fiber of the coil is damaged. Improvements of the transfer process are thus to be desired.

SUMMARY OF THE INVENTION

In accordance with this invention, an assembly is provided for the direct transfer of a wound coil between two mandrels, comprises the process comprising winding a coil onto a first mandrel having a first diameter greater than the diameter of a second mandrel onto which the wound coil is to be transferred, disposing the two mandrels in side-by-side coaxial relation, and contracting the first mandrel to a reduced diameter for reducing the tensile stress of the coil around the first mandrel for facilitating sliding the wound coil off the first mandrel and onto the second mandrel.

In a preferred process, the first mandrel is disposed over the second mandrel for allowing the wound coil to fall, of its own weight, off the first mandrel and onto the second mandrel.

In accordance with the invention, the first mandrel is hollow and has an axially extending tapered inner surface for mounting the first mandrel on a tapered outer surface of a draw bar. The outer diameter of the first mandrel is a function of the axial positioning of the draw bar within the mandrel. In a preferred embodiment, the draw bar is secured to a storage tray containing the second mandrel by means of screws for providing alignment of the first and second mandrels and for controlling the axial position of the draw bar within the first mandrel.

DESCRIPTION OF THE DRAWINGS

The drawings are partly schematic and not necessarily to scale.

DESCRIPTION OF A PREFERRED EMBODIMENT

Figure 1:
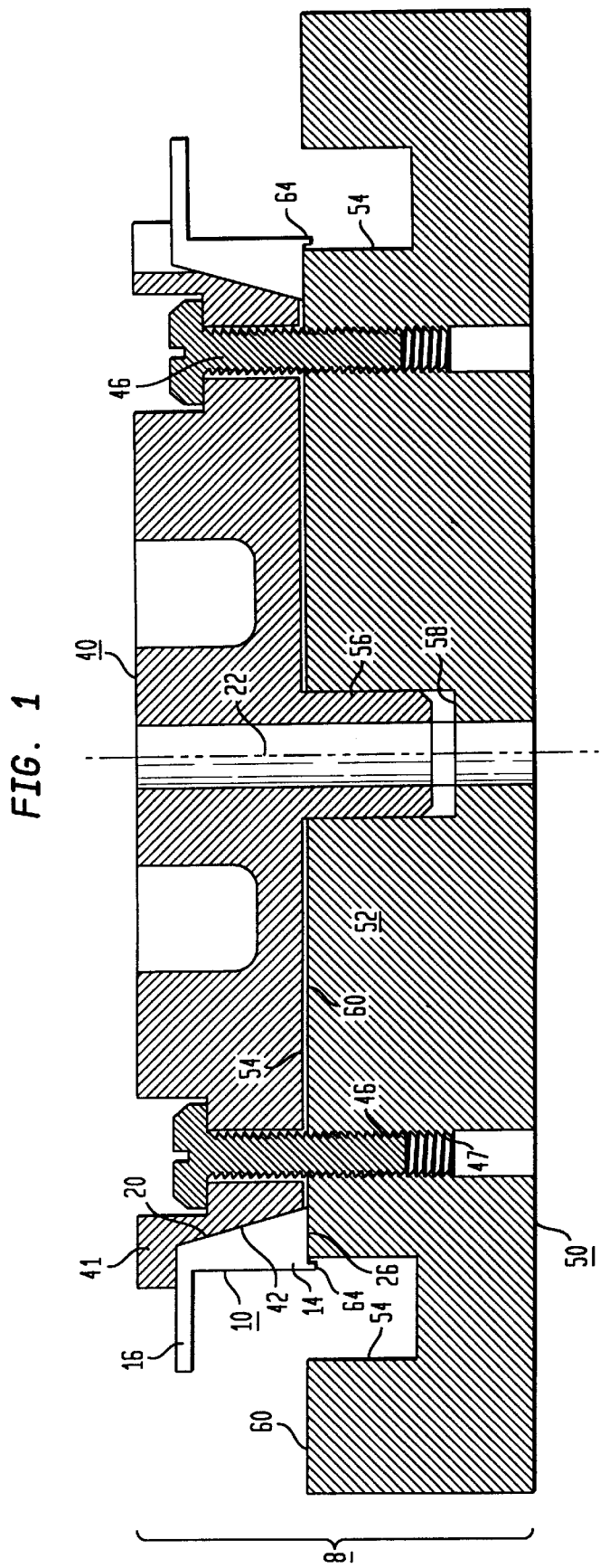
FIG. 1 shows, in section, a three-part assembly including an expandable "first" mandrel in accordance with this invention.

A three-part assembly 8 in accordance with one embodiment of the invention is shown in FIG. 1. The assembly 8 comprises an expandable ("first") mandrel 10 (shown more clearly in FIG. 2), a draw bar 40 for controlling the outside diameter of the mandrel 10, and a storage tray 50 containing a second mandrel 52 onto which a coil 12 (FIG. 3) wound on the first mandrel 10 is to be transferred.

The present invention has particular utility in connection with optical fibers used in telecommunication systems and, except as hereinafter described, the expandable mandrel 10 can be similar to known mandrels onto which optical fibers are wound and of known materials, e.g., a machinable plastic. The mandrel 10 also can be of various elastic materials, e.g., aluminum, depending upon the characteristics of the cables wound thereon.

Figure 2:
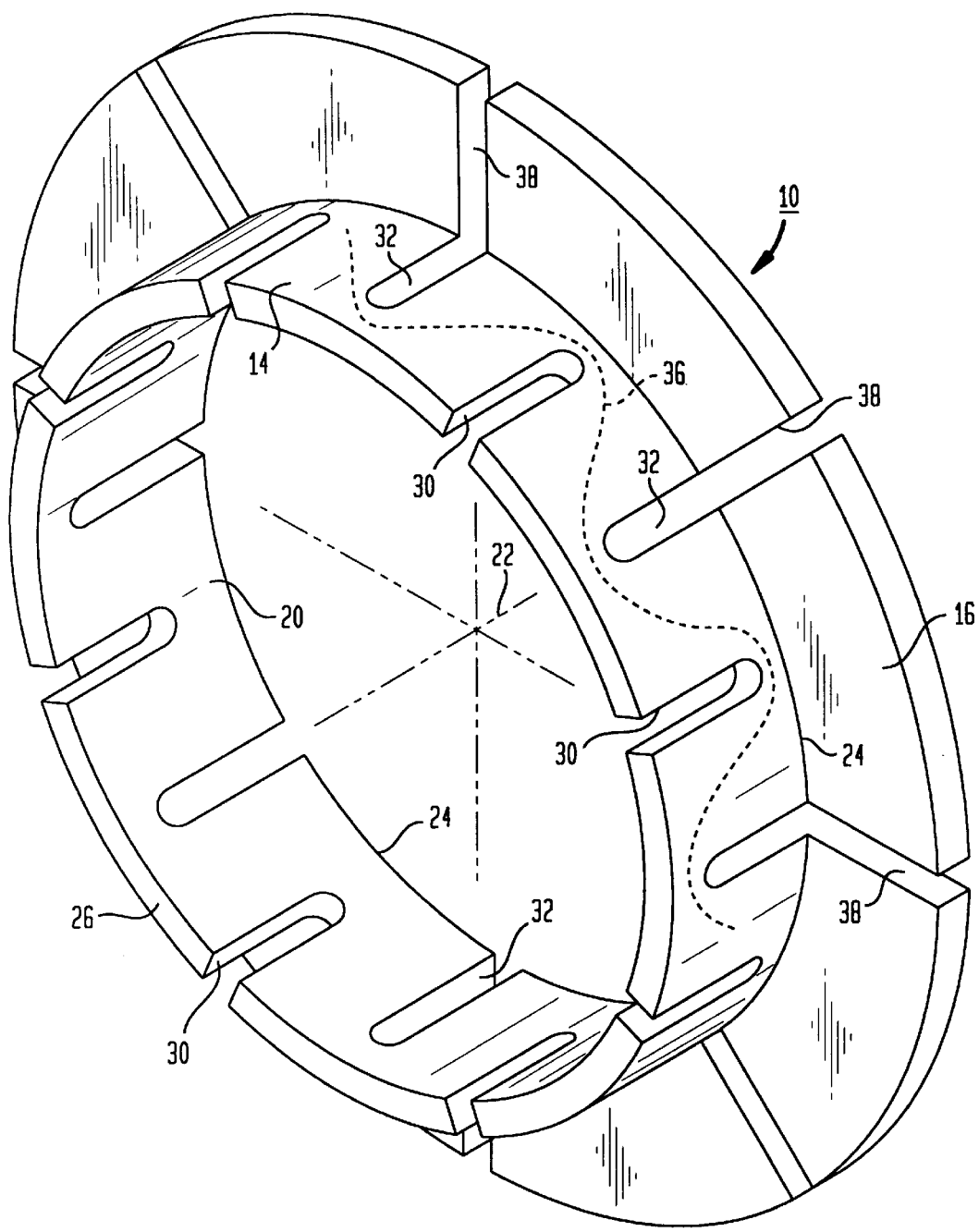
FIG. 2 is a perspective view of the expandable first mandrel shown in FIG. 1.

The expandable mandrel 10 is shown by itself in FIG. 2. A coil is to be wound onto the mandrel 10 and, to this end, the mandrel 10 includes a first circular cylinder 14 of uniform outside diameter and an integral radially extending flange 16 at one end of the cylinder 14. The flange 16 provides, in known manner, a means for positioning the end turns (FIG. 3) of the coil 12 to be wound onto the mandrel and, to the point so far described, the flange terminated cylinder 14 is similar to known type spools. The winding of a coil onto the mandrel is done in known fashion (hence not described herein) but with the exception that the mandrel 10 is in one of two possible configurations during the winding process. Obtaining the two mandrel configurations, in accordance with this invention, is now described.

Figure 3:
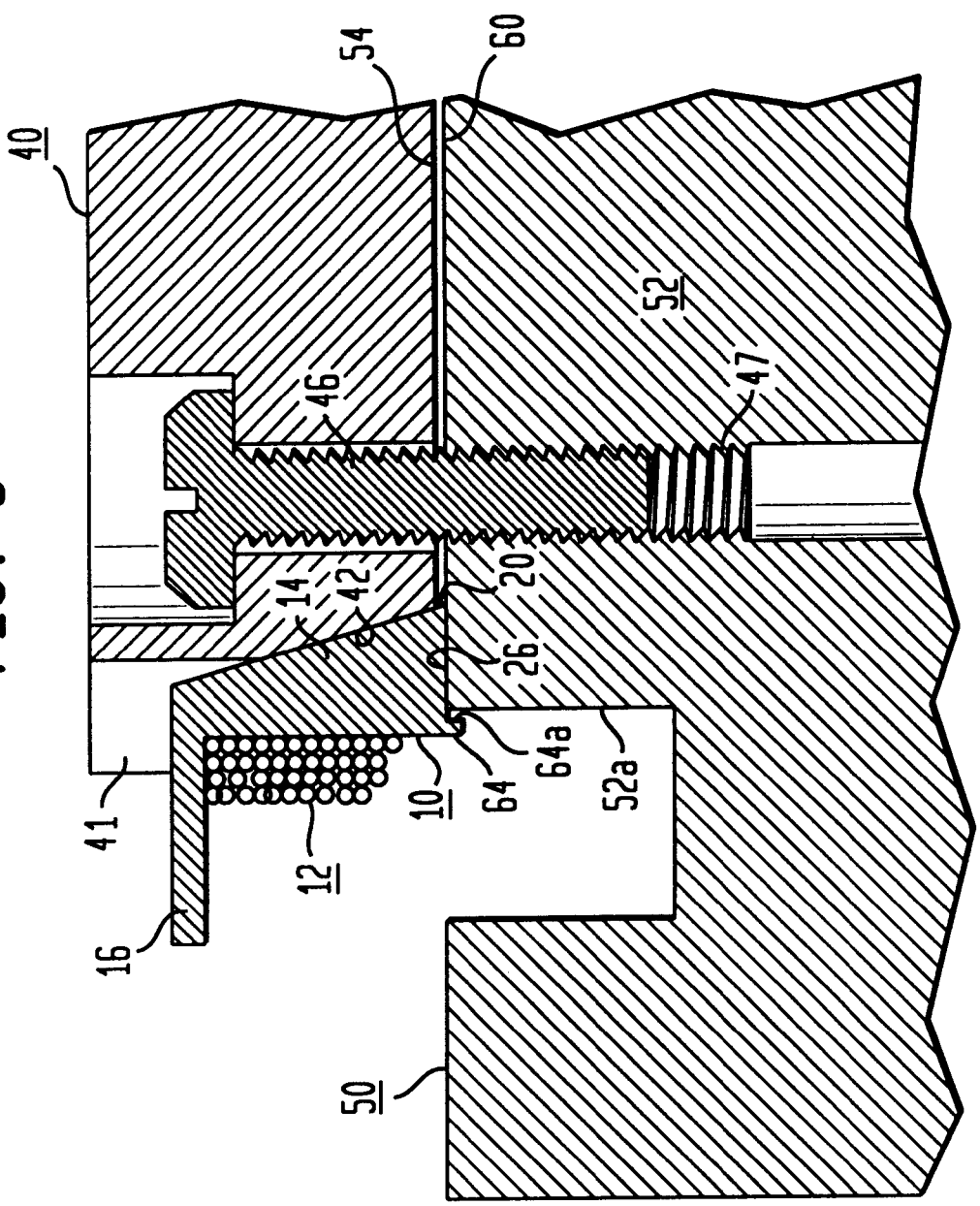
FIG. 3 shows a portion of the apparatus shown in FIG. 1, on an enlarged scale, but with a coil disposed on the first mandrel.
Figure 4:
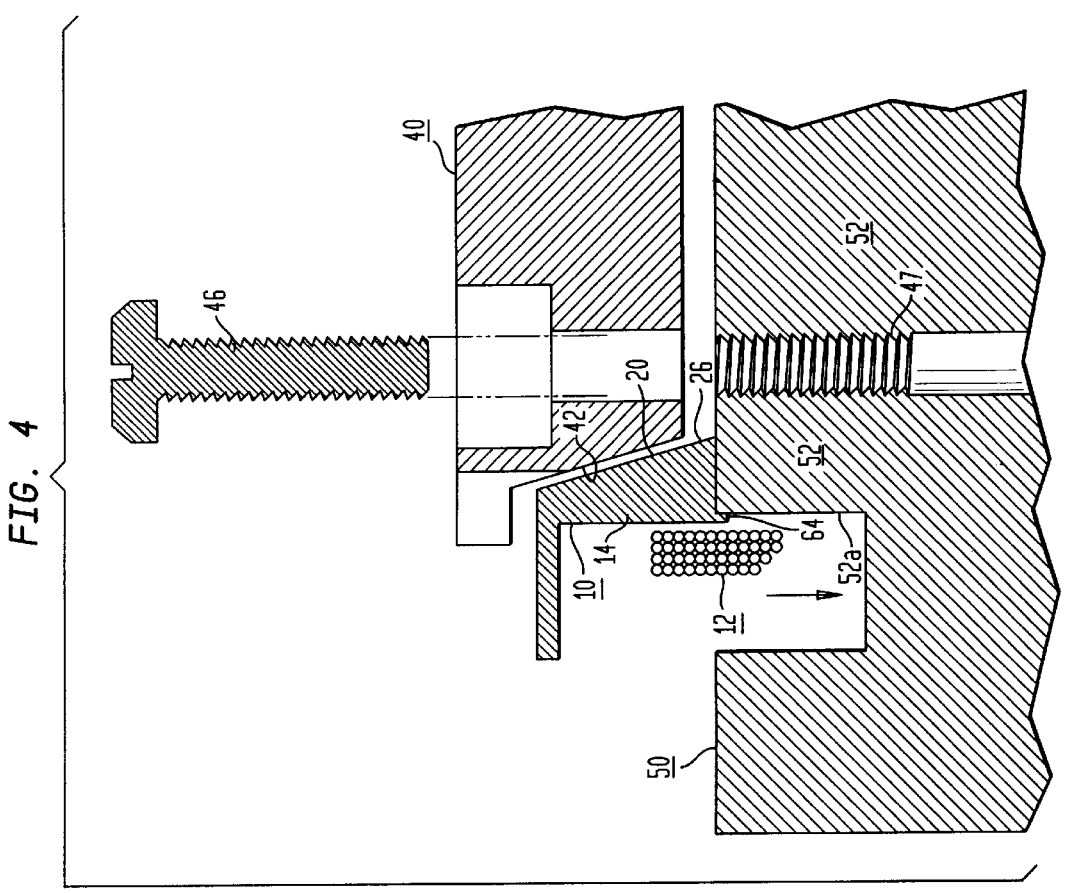
FIG. 4 is similar to FIG. 3 but showing the first mandrel in a contracted state and with the coil on the first mandrel in the process of sliding off the first mandrel and onto a second mandrel.

The mandrel 10 is elastically expandable and elastically self-contracting and, to this end, is hollow and has an inner tapered (conical) surface 20 as shown in FIGS. 3 and 4. Specifically, the inner surface 20 is circular in all planes normal to a central axis 22 (FIG. 2) of the cylinder, but of decreasing diameter in a direction from the flange end 24 of the first cylinder 14 towards the "free" end 26 thereof. As described hereinafter (in connection with FIGS. 3 and 4), a second cylinder 64 (shown in FIGS. 1, 3 and 4, but not in FIG. 2) is disposed at the end of the first cylinder 14 of the mandrel 10.

Additionally, three sets of slots are provided. Two sets of slots 30 and 32 extend axially along the wall of the cylinder 14 starting from respective opposite ends 26 and 24 thereof and terminate short of the other ends (e.g., the slots 30 start from the cylinder free end 26 and terminate short of the flange end 24). The slots 30 and 32 of the two sets are interdigitated with one another, thus providing the wall with a serpentine configuration (as indicated by the dash line 36 in FIG. 2) thus providing the cylinder 14 with a readily stretchable capacity for increasing the diameter of the cylinder. How the expansion is achieved is described hereinafter, but it is now noted that during the expansion of the cylinder the normally parallel side walls of the slots assume a slightly V-shape.

A third set of slots 38 is provided in the radial flange 16. These slots 38 extend the entire radial distance of the flange 16, hence provide large freedom of circumferential expansion of the flange 16. For providing minimum stresses between the flange 16 and the cylinder 14 during the expansion process, the slots 32 on the cylinder 14 merge with the slots 38 on the flange 16 for providing coincident areas of expansion of the cylinder and the flange.

By way of example, the cylinder 14 has an at rest (non-stressed) outer diameter of 2.410" and an inner diameter varying between 2.157" and 2.379". The cylinder 14 has a length of 0.340" and the slots 30 and 32 have a length of 0.290" and a width of 0.06". The flange 16 has an outer diameter of 2.870", a wall thickness of 0.040", and the slots 38 therein have a length of 0.290". During use, as described hereinafter, the cylinder 14 is expanded to an outside diameter of 2.430".

During expansion, maximum tensile stresses appear at the closed ends of the various slots 30 and 32 but, with the described dimensions, the amount of expansion, and the preferred material of the mandrel 10, these stresses are readily accommodated without tearing.

A means for causing radial expansion and contraction of the mandrel 10 is now described.

As previously mentioned, the mandrel 10, in this embodiment of the invention, is part of an assembly 8 shown in FIG. 1. In FIG. 1, the mandrel 10 is shown mounted on a draw bar 40 and clamped between the draw bar 40 and a rigid member storage tray 50 by means of screws 46 screwed into threaded openings 47 in the tray 50. While, as shown in FIG. 1, the storage tray 50 is an integral portion of the assembly 8, the storage tray 50 is to be later removed (as hereinafter described), and the mandrel 10 and the draw bar 40 (comprising a separate sub-assembly) are later re-used with a different storage tray.

The draw bar 40 has a tapered outer surface 42 (see, also, FIG. 4) corresponding to the tapered inner surface 20 of the mandrel cylinder 14. In the condition shown in FIG. 1, the draw bar 40 is disposed within the mandrel 10 and has been pulled inwardly of the mandrel, by the tightening of the screws 46, until an annular flange 41 at the upper end of the draw bar 40 is pressed against the flanged end of the mandrel 10. The mandrel free end 26 includes a radially extending end surface (see, also, FIG. 3) which is pressed against a radially extending end surface 60 of the storage tray 50. The lower end 54 of the draw bar 40 is disposed slightly spaced from the storage tray upper surface 60. As described, the cylinder 14 is readily expandable, and the movement of the draw bar 40 inwardly of the cylinder 14, owing to the direction of the tapers of the outer surface 42 of the draw bar 40 and the inner surface 20 of the cylinder 14, causes stretching of the cylinder wall and a radial expansion of the cylinder 14. Such movement of the draw bar inwardly of the mandrel is caused by a tightening of the screws 46 of the three-part assembly 8. The radial expansion of the cylinder 14 is relatively small, e.g., an increase of the cylinder outer diameter from 2.410" to 2,430", and no permanent stretching of the cylinder walls occur, i.e., the stretching is fully elastic. In FIG. 1, the mandrel 10 is at a precisely controlled maximum outer diameter. This is controlled by means of the flange 41 on the draw bar 40 engaging the flange end of the mandrel 10.

Owing to the elasticity of the cylinder 14, when the draw bar screws 46 are loosened, as shown in FIG. 4 and later to be described, the elasticity of the stretched and expanded cylinder is sufficient to force the draw bar 40 in a direction outwardly of the cylinder 14 and to cause contraction of the cylinder to a precisely controlled minimum outer diameter. How such control is achieved is hereinafter described.

Referring to FIG. 1, the storage tray 50 includes a "second" mandrel 52 surrounded by an annular space 54. As described hereinafter (in connection with FIGS. 3 and 4), a coil to be wound onto the "first" mandrel 10 is later dropped off the first mandrel 10 onto and around the second mandrel 52. The second mandrel 52 includes a circular guide bore 58 therein into which extends a circular guide rod 56 projecting forwardly of the end surface 54 of the draw bar 40. A close fit is provided between the circular guide rod 56 and the circular guide bore 58 for precisely coaxialy aligning the first mandrel 10 and the second mandrel 52 along an axis 22 central to the first mandrel 10, the draw bar 40 and the second mandrel 52.

As mentioned, in the condition shown in FIG. 1, the mandrel 10 is at its maximum outer diameter. As shown in FIG. 1, but more clearly shown in FIGS. 3 and 4 (later discussed), the mandrel 10 outer (variable) diameter is greater than the outer (fixed) diameter of the second mandrel 52. Extending forwardly from the free end 26 of the mandrel is a short length, thin wall, hollow cylinder 64 whose outer surface is a continuation of the outer surface of the mandrel cylinder 14. As shown in FIG. 1 (but clearer in FIG. 3), the inner surface 64a of the forwardly projecting cylinder 64 is spaced from the outer surface 52a of the second mandrel 52. Owing to the coaxial disposition of the various parts of the three part assembly 8, the inner surface 64a of the projecting cylinder 64 is concentric with the circular second mandrel 52. For drawing simplification, the mandrel forwardly extending cylinder 64 shown in FIGS. 1, 3 and 4 is not shown in FIG. 2.

With the mandrel 10 in its expanded configuration, as shown in FIG. 1, the three-part assembly 8 is disposed at a known winding station where a continuous optical fiber is wound into a coil around the mandrel cylinder 14. The result of such winding is partly shown in FIG. 3 with several layers of a multi-layered coil 12 being shown.

While the mandrel cylinder 14 is shown in FIG. 1 sandwiched between the mandrel flange 41 and the upper surface 60 of the storage tray 50, the outer surface of the cylinder 14 is sufficiently exposed and accessible for the winding of a coil 12 thereabout. Conversely, for reasons relating to how the storage tray 50 is to be thereafter used (and not described, as forming no part of the present invention), the "second" mandrel 52 contained within the storage tray 50 is not accessible for the direct winding of a coil thereabout. Rather, the coil 12 is first wound about the mandrel 10 and thereafter transferred to the mandrel 52. The apparatus used prior to the present invention is similar to the assembly shown in FIG. 1 except that the mandrel used is not expandable, and the draw bar used for drawing the mandrel against and into alignment with a storage tray (identical to the storage tray shown in FIG. 1) does not control the dimensions of the fixed outer diameter prior art "first" mandrel.

In anticipation of a later stripping of the wound coil 12 off the mandrel 10, the fiber is preferably wound with a minimum tension consistent with proper control of the coil winding process. The wound coil thus exerts a compressive force against the cylinder 14. This force is resisted by the draw bar 40 which remains tightly screwed into the storage tray 50.

With a wound coil 12 now in place on the mandrel 10, the three-part assembly 8 is removed from the winding station and the coil 12 wound onto the mandrel 10 is transferred to the mandrel 52 of the storage tray 50. This is quite readily accomplished according to the present invention by disposing the assembly 8 in horizontal orientation, as shown in FIGS. 2–4, and loosening the screws 46. As previously explained, the draw bar 40 is thus forced in a direction upwardly and out of the mandrel 10 for allowing contraction of the mandrel. (For greater clarity, FIG. 4 shows the draw bar 40 spaced apart from the mandrel 10. The contraction of the mandrel 10 causes upward axial movement of the draw bar 40 with the draw bar outer surface 42 sliding along the inner surface 20 of the mandrel and maintaining contact therewith.)

Initially, such contraction of the mandrel is in response to the tension of the wound coil 12 around the mandrel 10. However, owing to the relatively small tension with which the coil 12 is wound, plus the fact that optical fibers are relatively stiff, the wound coil 12 contracts only a relatively small amount to a minimum inside diameter. As shown in FIG. 4, the coil minimum inside diameter is preferably at least slightly greater than the diameter of the second mandrel 52.

Preferably, however, for ease of removal of the coil 12 from the mandrel 10, it is desired that the mandrel 10 contract to an outside diameter somewhat less than the inside contracted diameter of the coil 12, such as is illustrated in FIG. 4. Such additional contraction of the mandrel 10 is achieved owing to the elasticity of the mandrel 10. With the draw bar screws 46 loosened and the mandrel 10 free to contract, such contraction occurs until (FIG. 4) the forwardly projecting cylindrical wall 64 at the free end 26 of the mandrel cylinder 14 engages the upper edge of the second mandrel 52 and extends downwardly a short distance along the upper length of the mandrel 52. Thus, with the now oversize coil 12 free to slide downwardly off the reduced diameter mandrel 10, the cylindrical wall 64 serves to guide the falling coil 12 onto the mandrel 52.

Indeed, in some instances, upon contraction of the mandrel 10, the coil 12 begins to so loosen as to lose its uniform layered shape and to begin to collapse. However, owing to the overlapping relationship of the first mandrel 10 around the second mandrel 52, the coil falls smoothly, if somewhat disheveled, onto and around the mandrel 52. In this application, it is not required that the transferred optical fiber cable be neatly layered around the mandrel 52.

In other instances where it might be desired to retain the neatly layered coil configuration, the mandrel contraction is such as to leave some compressive force of the coil 12 around the mandrel 10. The coil 12 thus clings to the mandrel and retains its shape while requiring some prodding for the transfer process. Still, by significantly reducing the coil compression around the mandrel, the prior art process of prodding the coil 12 off the first mandrel 10 and onto the second mandrel 52 is greatly facilitated.

With the coil 12 now transformed from the first mandrel 10 onto the second mandrel 52 of the storage tray 50, the mandrel 10-draw bar 40 sub-assembly is now completely separated from the coil containing tray 50. The mandrel-draw bar sub-assembly is then attached to a new tray 50 for a re-use of the sub-assembly for the winding thereon of a new coil to be transferred to the new tray.

What is claimed is:

1. A coil winding assembly comprising a hollow radially expandable first mandrel and a variable diameter draw bar disposed within said mandrel and engaging an inner surface of said mandrel for controlling the outer diameter of the mandrel dependent upon the position of the draw bar within the mandrel, and a rigid member to which said draw bar is spacially variably attached for varying the position of said draw bar within said mandrel.

2. An assembly according to claim 1 wherein said rigid member includes a second mandrel in side-by-side coaxial relation with said first mandrel, said draw bar including a guide rod disposed within a guide bore within said second mandrel for maintaining said coaxial relation between said first and second mandrels, and screws for attaching said draw bar said rigid member for varying the position of said draw bar within said first mandrel.

3. An assembly according to claim 1 wherein said mandrel inner surface tapers inwardly from a first towards a second end of said first mandrel, and said draw bar has a tapered outer surface corresponding to the taper of the inner surface of said first mandrel.

4. An assembly according to claim 1 wherein said first mandrel comprises a first circular cylinder having a radially extending first end surface, said rigid member including a second circular cylindrical mandrel in coaxial relation with said first mandrel and including a radially extending second end surface contacting said first end surface of said first mandrel, and said first mandrel including a second circular cylinder extending beyond said first end surface and being disposed in overlapping, encircling relation with said second end surface of said second mandrel.

5. An assembly according to claim 4 wherein said first mandrel first circular cylinder has slots therethrough providing said first cylinder with a circumferential serpentine configuration for providing the first mandrel with an elastic expandability.

6. An assembly according to claim 5 wherein said first mandrel has an outside diameter variable from a first to a larger, second outside diameter, and said second circular cylinder contacts said second mandrel when said first mandrel is at said first outside diemeter.

7. An assembly according to claim 6 wherein the outside diameter of said first mandrel is elastically variable from said first to a smaller, third outside diameter, and said second circular cylinder is elastically compressed against said second mandrel when said first mandrel is at said first outside diameter.

* * * * *